US010296450B2

(12) United States Patent
Vainer (10) Patent No.: US 10,296,450 B2
(45) Date of Patent: *May 21, 2019

(54) EXPLORATORY TESTING ON MULTIPLE SYSTEM LANDSCAPES

(71) Applicant: SAP Portals Israel Ltd., Ra'anana (IL)

(72) Inventor: Vitaly Vainer, Kfar Saba (IL)

(73) Assignee: SAP Portals Israel Ltd, Ra'anana (IL)

( * ) Notice: Subject to any disclaimer, the term of this patent is extended or adjusted under 35 U.S.C. 154(b) by 12 days.

This patent is subject to a terminal disclaimer.

(21) Appl. No.: 15/484,323

(22) Filed: Apr. 11, 2017

(65) Prior Publication Data

US 2017/0220460 A1 Aug. 3, 2017

Related U.S. Application Data

(63) Continuation of application No. 14/918,828, filed on Oct. 21, 2015, now Pat. No. 9,652,367.

(51) Int. Cl.
*G06F 9/44* (2018.01)
*G06F 11/36* (2006.01)

(52) U.S. Cl.
CPC ...... *G06F 11/3692* (2013.01); *G06F 11/3688* (2013.01)

(58) Field of Classification Search
CPC .......................... G06F 11/3692; G06F 11/3688
USPC ........................................................ 717/127
See application file for complete search history.

(56) References Cited

U.S. PATENT DOCUMENTS

| 5,732,273 | A  |   | 3/1998  | Srivastava et al. |
|-----------|----|---|---------|-------------------|
| 6,115,711 | A  | * | 9/2000  | White ........................ G06F 8/38 |
| 7,089,456 | B2 |   | 8/2006  | Gender et al. |
| 7,774,172 | B1 |   | 8/2010  | Yunt et al. |
| 7,945,898 | B1 | * | 5/2011  | Episkopos .......... G06F 11/3696 703/13 |
| 7,984,304 | B1 |   | 7/2011  | Waldspurger et al. |
| 8,321,430 | B2 |   | 11/2012 | Zvi et al. |
| 8,583,678 | B2 |   | 11/2013 | Vainer et al. |
| 8,751,558 | B2 |   | 6/2014  | Bleier et al. |
| 8,930,908 | B2 | * | 1/2015  | Bloching ............ G06F 11/3688 717/124 |
| 9,053,152 | B2 |   | 6/2015  | Sherman et al. |
| 9,070,109 | B2 |   | 6/2015  | Sherman et al. |
| 9,152,947 | B2 |   | 10/2015 | Sherman et al. |

(Continued)

*Primary Examiner* — Chameli Das
(74) *Attorney, Agent, or Firm* — Fish & Richardson P.C.

(57) ABSTRACT

The present disclosure involves systems, software, and computer implemented methods for testing applications on multiple system landscapes. In one example, a method may include identifying instructions to test a plurality of system landscapes, executing a test of a first system landscape from the plurality of system landscapes, validating a response received from the first system landscape by a user associated with the testing, executing tests of at least a subset of the remaining plurality of system landscapes which includes sending requests including the predefined input to the entry point of each of the subset of the remaining plurality of system landscapes, receiving responses from the subset of the remaining plurality of system landscapes, and comparing each received response to the validated response from the first system landscape, and in response to the comparison, generating a result set of the comparison of each received response to the validated response.

15 Claims, 4 Drawing Sheets

(56) References Cited

U.S. PATENT DOCUMENTS

| | | |
|---|---|---|
| 2002/0199172 A1 | 12/2002 | Bunnell et al. |
| 2003/0202638 A1 | 10/2003 | Eringis et al. |
| 2004/0068714 A1 | 4/2004 | Deinnel et al. |
| 2005/0166094 A1* | 7/2005 | Blackwell ........... G06F 11/3664 |
| | | 714/38.14 |
| 2005/0268288 A1 | 12/2005 | Nattinger et al. |
| 2006/0174227 A1 | 8/2006 | Bearman et al. |
| 2008/0091775 A1 | 4/2008 | Wang et al. |
| 2012/0041922 A1 | 2/2012 | Vainer et al. |
| 2012/0331447 A1 | 12/2012 | Nayak et al. |
| 2013/0086483 A1 | 4/2013 | Vainer et al. |
| 2013/0086495 A1 | 4/2013 | Guzansky et al. |
| 2013/0091132 A1 | 4/2013 | Khalatov et al. |
| 2013/0091456 A1 | 4/2013 | Sherman et al. |
| 2013/0116976 A1 | 5/2013 | Kanemasa et al. |
| 2013/0139081 A1 | 5/2013 | Alon et al. |
| 2013/0151682 A1 | 6/2013 | Kruempelmann et al. |
| 2013/0152047 A1* | 6/2013 | Moorthi ................ G06F 11/368 |
| | | 717/124 |
| 2013/0159926 A1 | 6/2013 | Vainer et al. |
| 2013/0290094 A1 | 10/2013 | Srivastava et al. |
| 2014/0013000 A1 | 1/2014 | Vainer et al. |
| 2014/0040177 A1 | 2/2014 | Sherman et al. |
| 2014/0040178 A1 | 2/2014 | Sherman et al. |
| 2015/0033212 A1 | 1/2015 | Mizobuchi et al. |
| 2018/0143897 A1* | 5/2018 | Shani ................... G06F 11/302 |

* cited by examiner

EXPLORATORY TESTING ON MULTIPLE SYSTEM LANDSCAPES

CLAIM OF PRIORITY

This application claims priority under 35 USC § 120 to U.S. patent application Ser. No. 14/918,828, filed on Oct. 21, 2015, the entire contents of which are hereby incorporated by reference.

TECHNICAL FIELD

The present disclosure relates to systems, software, and computer-implemented methods for testing applications on multiple system landscapes.

BACKGROUND

New and updated applications are developed based on a platform. To support the new and updated applications, software vendors, system integrators (SIs), and IT departments need to test and validate the new applications on all or at least the most prominent combinations of system landscapes of the platform.

SUMMARY

The present disclosure involves systems, software, and computer-implemented methods for testing applications on multiple system landscapes. One computer-implemented method includes: identifying instructions to test a plurality of system landscapes, executing a test of a first system landscape from the plurality of system landscapes, validating a response received from the first system landscape by a user associated with the testing, executing tests of at least a subset of the remaining plurality of system landscapes which includes sending requests including the predefined input to the entry point of each of the subset of the remaining plurality of system landscapes, receiving responses from the subset of the remaining plurality of system landscapes, and comparing each received response to the validated response from the first system landscape, and in response to the comparison, generating a result set of the comparison of each received response to the validated response.

While generally described as computer-implemented software embodied on non-transitory, tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

The present disclosure describes systems and tools for providing simultaneous and/or concurrent exploratory testing applications on multiple system landscapes. A system landscape is a combination of all of the systems and components required to run the applications. To support the applications on a platform, software vendors, SIs, and IT departments need to test the applications on all or at least the most prominent combinations of system landscapes of the platform. This disclosure describes the process to test applications on multiple system landscapes by validating one test result of one system landscape and comparing test results of the rest of the system landscapes to the validated test result.

New and updated applications (e.g., new components, solutions, versions of applications, etc.) are developed based on a platform, such as a platform-as-a-service. In some instances, the platform includes a backend, a middleware, and a frontend. To test the new applications in the platform, multiple system landscapes of the platform need to be generated and subsequently tested for validity. For example, a Leave Request application may have the following system landscape options based on a various possible implementations:

Backend
    ERP 6.0 EhP2 SPS 05 (February 2009)
    ERP 6.0 EhP3 SPS 05 (August 2009)
    ERP 6.0 EhP4 SPS 05 (November 2009)
    ERP 6.0 EhP4/NW 7.01—SPS 05 (November 2009)
    ERP 6.0 EhP5—SPS 03—(December 2010)
    ERP 6.0 EhP6—SPS 01 (November 2011)
    ERP 6.0 SPS 15 (February 2009)
oData provisioning
    NetWeaver Gateway Hub
    NetWeaver Gateway AddOn
    HCI oData Provisioning
    HCI application edition
Frontend
    Fiori ABAP Frontend Server (works with NetWeaver Gateway Add On or Hub only)
    Fiori cloud edition—Internal Access Point (works with NetWeaver Gateway Add On or Hub only)
    Fiori cloud edition—External Access Point Overall, a total of 56 system landscapes may need to be tested in order to support Leave Request application for all suitable permutations.

There are several approaches to perform application testing on multiple system landscapes, including manual testing, automated testing, and others. In manual testing, each system landscape is tested manually. As the number of system landscapes increases, the time required for the testing increases. In automated testing, inputs and expected outputs need to be predefined before running the automated test. Predefining expected output is expensive, especially for newly developed application capabilities and new user interfaces. This disclosure is focused on automatically testing multiple system landscapes, manually validating a test response of a single system landscape selected from the multiple system landscapes, and automatically comparing the rest of the test responses to the validated test response. The present solution may provide the following advantages, among others. Manually validating only one test response reduces the time that is required to manually test against multiple system landscapes. Automatically comparing the rest of the test responses allows the testing to be performed for all system landscapes with approximately the same time as testing a single system landscape. Since test information (e.g., test request, test responses, validated test response, system landscapes) may be stored and reviewed, when an error or possible error is found for a particular system landscape, it is easy to later access the stored test information and validate a solution to the error after modifications are made to the particular system landscape. This testing mechanism will ensure consistency among platforms, while strictly manual testing may result in some inconsistencies. In addition, platforms with performance issues on particular step are also easier identified. Any suitable testing algorithm for multiple system landscapes will benefit from the solution.

Figure 1:
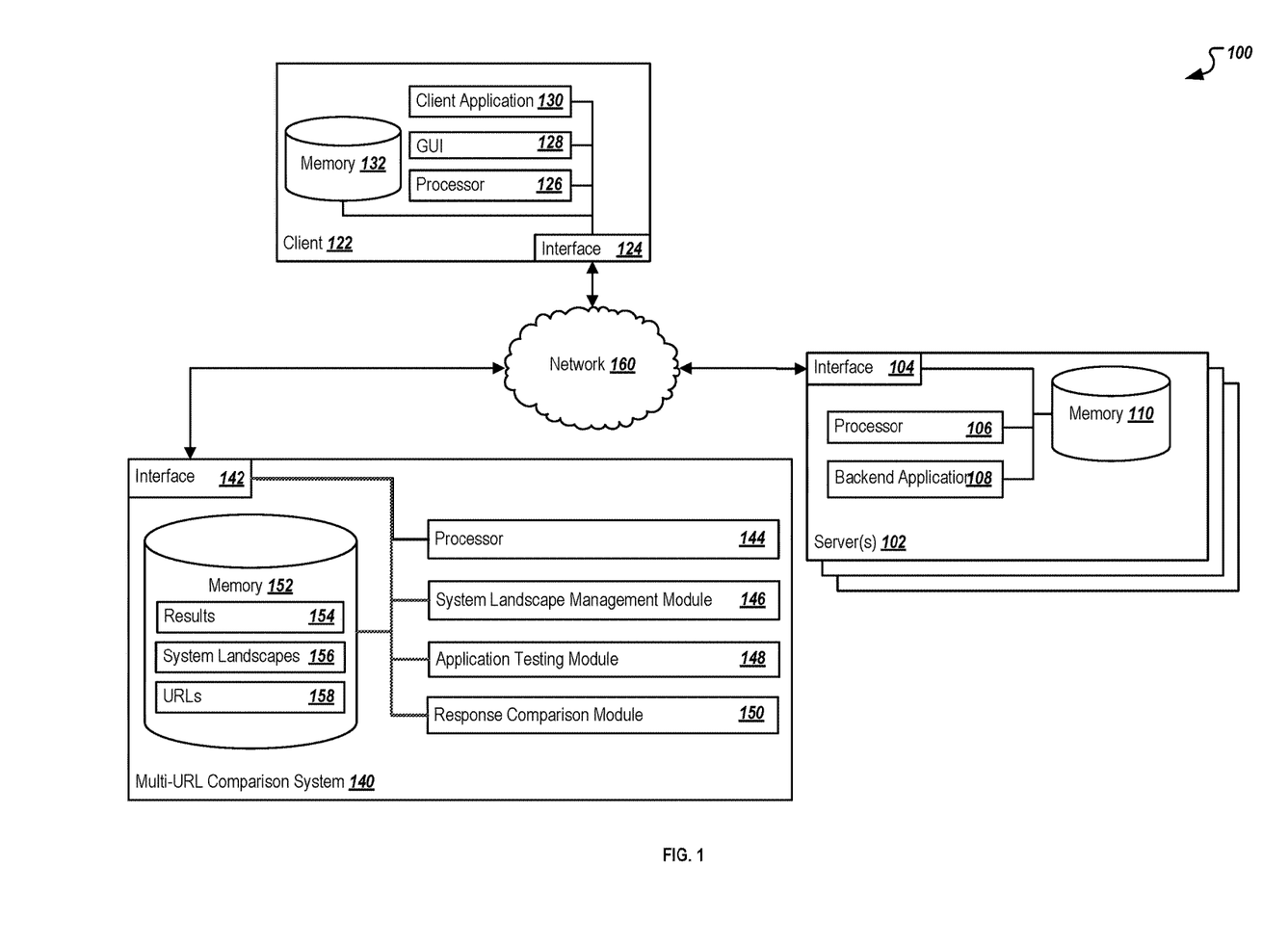
FIG. 1 is a block diagram illustrating an example system for testing applications on multiple system landscapes.

Turning to the illustrated embodiment, FIG. 1 is a block diagram illustrating an example system 100 for testing applications on multiple system landscapes. Specifically, the illustrated system 100 includes or is communicably coupled with one or more servers 102, a client 122, a Multi-URL (Uniform Resource Locator) comparison system 140, and a network 160. Although shown separately, in some implementations, functionality of two or more systems or servers may be provided by a single system or server. In some implementations, the functionality of one illustrated system or server may be provided by multiple systems or servers. While server 102 is illustrated as a single server, server 102 is meant to represent any combination of systems, including front end, middleware, and backend systems, as appropriate. In such implementations, a UI of the application may reside on the front end, the middleware may provide standard services for the application (e.g., in the form of oData protocol), and the backend may perform the actual data processing. While not necessary for the described tools and advantages to be realized, such multi-tier architectures can result in a large number of system landscape combinations, as multiple front ends, middleware, and backend systems may be combined in various ways.

As used in the present disclosure, the term "computer" is intended to encompass any suitable processing device. For example, server 102 may be any computer or processing device such as, for example, a blade server, general-purpose personal computer (PC), Mac®, workstation, UNIX-based workstation, or any other suitable device. Moreover, although FIG. 1 illustrates server 102 as a single system, server 102 can be implemented using two or more systems, as well as computers other than servers, including a server pool. In other words, the present disclosure contemplates computers other than general-purpose computers, as well as computers without conventional operating systems. Further, illustrated server 102, client 122, and Multi-URL comparison system 140 may each be adapted to execute any operating system, including Linux, UNIX, Windows, Mac OS®, JAVA™, Android™, or iOS. According to one implementation, the illustrated systems may also include or be communicably coupled with a communication server, an e-mail server, a web server, a caching server, a streaming data server, and/or other suitable server or computer.

In general, server 102 may be any suitable computing server or system for running applications in response to requests for testing the applications. The server 102 is described herein in terms of responding to requests for testing applications from users at client 122 and other clients. However, the server 102 may, in some implementations, be a part of a larger system providing additional functionality. For example, server 102 may be part of an enterprise business application or application suite providing one or more of enterprise relationship management, data management systems, customer relationship management, and others. For testing purposes, server 102 may receive a request to execute a testing or validity-related operation, and can provide a response back to the appropriate requestor. In some implementations, the server 102 may be associated with a particular URL for web-based applications. The particular URL can trigger execution of a plurality of components and systems.

As illustrated, server 102 includes an interface 104, a processor 106, a backend application 108, and memory 110. In general, the server 102 is a simplified representation of one or more systems and/or servers that provide the described functionality, and is not meant to be limiting, but rather an example of the systems possible.

The interface 104 is used by the server 102 for communicating with other systems in a distributed environment—including within the system 100—connected to the network 160, e.g., client 122 and other systems communicably coupled to the network 160. Generally, the interface 104 comprises logic encoded in software and/or hardware in a suitable combination and operable to communicate with the network 160. More specifically, the interface 104 may comprise software supporting one or more communication protocols associated with communications such that the network 160 or interface's hardware is operable to communicate physical signals within and outside of the illustrated environment 100.

Network 160 facilitates wireless or wireline communications between the components of the environment 100 (i.e., between server 102 and client 122, between server 102 and Multi-URL comparison system 140, and among others), as well as with any other local or remote computer, such as additional clients, servers, or other devices communicably coupled to network 160, including those not illustrated in FIG. 1. In the illustrated system, the network 160 is depicted as a single network, but may be comprised of more than one network without departing from the scope of this disclosure, so long as at least a portion of the network 160 may facilitate communications between senders and recipients. In some instances, one or more of the illustrated components may be included within network 160 as one or more cloud-based services or operations. For example, the Multi-URL comparison system 140 may be cloud-based services. The network 160 may be all or a portion of an enterprise or secured network, while in another instance, at least a portion of the network 160 may represent a connection to the Internet. In some instances, a portion of the network 160 may be a virtual private network (VPN). Further, all or a portion of the network 160 can comprise either a wireline or wireless link. Example wireless links may include 802.11ac/ad,/af/a/b/g/n, 802.20, WiMax, LTE, and/or any other appropriate wireless link. In other words, the network 160 encompasses any internal or external network, networks, sub-network, or combination thereof operable to facilitate communications between various computing components inside and outside the illustrated system 100. The network 160 may communicate, for example, Internet Protocol (IP) packets, Frame Relay frames, Asynchronous Transfer Mode (ATM) cells, voice, video, data, and other suitable information between network addresses. The network 160 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the server 102 includes a processor 106. Although illustrated as a single processor 106 in FIG. 1, two or more processors may be used according to particular needs, desires, or particular implementations of the environment 100. Each processor 106 may be a central processing unit (CPU), an application-specific integrated circuit (ASIC), a field-programmable gate array (FPGA), or another suitable component. Generally, the processor 106 executes instructions and manipulates data to perform the operations of the server 102. Specifically, the processor 106 executes the algorithms and operations described in the illustrated figures, including the operations performing the functionality associated with the server 102 generally, as well as the various software modules (e.g., the backend application 108), including the functionality for sending communications to and receiving transmissions from client 122.

The backend application 108 represents an application, set of applications, software, software modules, or combination of software and hardware used to perform operations related to testing applications in the server 102. In the present solution, the backend application 108 can perform operations including receiving requests for testing applications in the server 102, running tests for the applications, providing test response, and performing standard operations associated with the backend application 108. The backend application 108 can include and provide various functionality to assist in the management and execution of testing applications. As noted, the backend application 108 may be an entry point associated with execution of a particular instance of an end-to-end or composite application, where when execution is initiated at the backend application 108, one or more additional applications and/or systems Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, JAVA™, VISUAL BASIC, assembler, Perl®, any suitable version of 4GL, as well as others.

As illustrated, server 102 includes memory 110, or multiple memories 110. The memory 110 may include any memory or database module and may take the form of volatile or non-volatile memory including, without limitation, magnetic media, optical media, random access memory (RAM), read-only memory (ROM), removable media, or any other suitable local or remote memory component. The memory 110 may store various objects or data, including financial and/or business data, application information including URLs and settings, user information, behavior and access rules, administrative settings, password information, caches, backup data, repositories storing business and/or dynamic information, and any other appropriate information including any parameters, variables, algorithms, instructions, rules, constraints, or references thereto associated with the purposes of the backend application 108 and/or server 102. Additionally, the memory 110 may store any other appropriate data, such as VPN applications, firmware logs and policies, firewall policies, a security or access log, print or other reporting files, as well as others.

Client 122 may be any computing device operable to connect to or communicate with Multi-URL comparison system 140, other clients (not illustrated), or other components via network 160, as well as with the network 160 itself, using a wireline or wireless connection, and can include a desktop computer, a mobile device, a tablet, a server, or any other suitable computer device. In general, client 122 comprises an electronic computer device operable to receive, transmit, process, and store any appropriate data associated with the system 100 of FIG. 1. In some instances, client 122 can be a particular thing within a group of the internet of things, such as a connected appliance or tool.

As illustrated, client 122 includes an interface 124, a processor 126, a graphical user interface (GUI) 128, a client application 130, and memory 132. Interface 124 and processor 126 may be similar to or different than the interface 104 and processor 106 described with regard to server 102. In general, processor 126 executes instructions and manipulates data to perform the operations of the client 122. Specifically, the processor 126 can execute some or all of the algorithms and operations described in the illustrated figures, including the operations performing the functionality associated with the client application 130 and the other components of client 122. Similarly, interface 124 provides the client 122 with the ability to communicate with other systems in a distributed environment—including within the system 100—connected to the network 160.

Client 122 executes a client application 130. The client application 130 may operate with or without requests to the server 102—in other words, the client application 130 may execute its functionality without requiring the server 102 in some instances, such as by accessing data stored locally on the client 122. In others, the client application 130 may be operable to interact with the server 102 by sending requests via Multi-URL comparison system 140 to the server 102 for testing applications. In some implementations, the client application 130 may be a standalone web browser, while in others, the client application 130 may be an application with a built-in browser. The client application 130 can be a web-based application or a standalone application developed for the particular client 122. For example, the client application 130 can be a native iOS application for iPad, a desktop application for laptops, as well as others. In another example, the client application 130, where the client 122 is a particular thing (e.g., device) within a group of the internet of things, may be software associated with the functionality of the thing or device. In some instances, the client application 130 may be an application that requests for application test results from the server 102 for presentation and/or execution on client 122. In some instances, client application 130 may be an agent or client-side version of the backend application 108.

Memory 132 may be similar to or different from memory 110 of the server 102. In general, memory 132 may store various objects or data, including any parameters, variables, algorithms, instructions, rules, constraints, or references thereto associated with the purposes of the client application 130 and/or client 122. Additionally, the memory 132 may store any other appropriate data, such as VPN applications, firmware logs and policies, firewall policies, a security or access log, print or other reporting files, as well as others.

The illustrated client 122 is intended to encompass any computing device such as a desktop computer, laptop/notebook computer, mobile device, smartphone, personal data assistant (PDA), tablet computing device, one or more processors within these devices, or any other suitable processing device. For example, the client 122 may comprise a computer that includes an input device, such as a keypad, touch screen, or other device that can accept user information, and an output device that conveys information associated with the operation of the client application 130 or the client 122 itself, including digital data, visual information, or a GUI 128, as shown with respect to the client 122.

Multi-URL comparison system 140 may be any computing component operable to connect to or communicate with one or more servers 102, client 122, or other components via network 160, as well as with the network 160 itself, using a wireline or wireless connection, and can include a browser extension (e.g., a browser plug-in), a network proxy, a cloud-based application, or any other suitable components. Although shown separately from the client 122 in FIG. 1, in some implementations, Multi-URL comparison system 140 may be part of the client 122 as a browser extension to the client application 130 or alternatively, as part of the functionality of the client application 130. In general, Multi-URL comparison system 140 comprises an electronic computer component operable to receive, transmit, process, and store any appropriate data associated with the system 100 of FIG. 1. In some instances, Multi-URL comparison system 140 can be a particular thing within a group of the interne of things, such as a connected appliance or tool.

As illustrated, Multi-URL comparison system 140 includes an interface 142, a processor 144, a system landscape management module 146, an application testing module 148, a response comparison module 150, and memory 152. In some implementations, the Multi-URL comparison system 140 may include additional and/or different components not shown in the block diagram. In some implementations, components may also be omitted from the block diagram. For example, when the Multi-URL comparison system 140 is implemented as a browser extension to the client application 130, the processor 144 may be omitted.

Interface 142 and processor 144 may be similar to or different than the interface 104 and processor 106 described with regard to server 102. In general, processor 144 executes instructions and manipulates data to perform the operations of the Multi-URL comparison system 140. Specifically, the processor 144 can execute some or all of the algorithms and operations described in the illustrated figures, including the operations performing the functionality associated with the system landscape management module 146, the application testing module 148, the response comparison module 150, and the other components of Multi-URL comparison system 140. Similarly, interface 142 provides the Multi-URL comparison system 140 with the ability to communicate with other systems in a distributed environment—including within the system 100—connected to the network 160.

The Multi-URL comparison system 140 includes one or more software and/or firmware components that implement the system landscape management module 146. The system landscape management module 146 can provide functionality associated with managing system landscapes 156 and identifying URLs 158 for corresponding system landscapes 156. Each system landscape in the system landscapes 156 represents or is associated with a combination of components for executing a particular version of an application. For example, for the Leave Request application described before, one system landscape includes a backend component of ERP 6.0 EhP2 SPS 05 (February 2009), an oData provisioning component of NetWeaver Gateway AddOn, and a frontend component of Fiori ABAP Frontend Server. For each system landscape, an associated entry point is generated for or identified for initiating execution. For example, the entry point in one instance may be a URL identifying the associated system landscape, wherein requests sent to the URL result in a response from the associated system landscape after the application is executed there. In some instances, the entry point is a URI (Uniform Resource Identifier) of the associated system landscape. Note that, in some implementations, the system landscape management module 146 can perform landscape management using a technique different than the landscape management technique described herein.

The Multi-URL comparison system 140 includes one or more software and/or firmware components that implement the application testing module 148. The application testing module 148 can provide functionality associated with testing a particular version of an application against all or at least the most prominent combinations of system landscapes 156. In some implementations, the application testing module 148 receives a testing request from the client 122 or from another system, including from an internal user of the Multi-URL comparison system 140, and stores the testing request locally (e.g., in memory 152). For each tested system landscape, the application testing module 148 sends the same testing request to the associated URL identified by the system landscape management module 146 and corresponding to that particular system landscape, the application testing module 148 subsequently receiving a response from the associated URL to which the testing request was sent. In some implementations, one of the received responses is selected to be used for validation and, upon review and validation, as the validated response. The received responses, including the validated response, are stored locally (e.g., in memory 152) and may be used by the response comparison module 150. Note that, in some implementations, the application testing module 148 can perform application testing using a technique different than the application testing technique described herein.

The Multi-URL comparison system 140 also includes one or more software and/or firmware components that implement the response comparison module 150. The response comparison module 150 can provide functionality associated with comparing test responses and generating a result set of the comparison of each received response to the validated response. It is assumed that the same testing request should generate the same response on all system landscapes for the comparison to be meaningful. For some network options, responses for the same testing request may include different headers. In those cases, responses excluding headers are used for validation and comparison. In some implementations, responses received from system landscapes (e.g., network responses) are compared without being rendered. In some implementations, responses are rendered (e.g., rendered responses) before being compared. In some implementations, response time (e.g., the time between sending a request and receiving a corresponding response) for each tested system landscape is gathered and compared by the Multi-URL comparison system 140. Note that, in some implementations, the response comparison module 150 can perform response comparison using a technique different than the response comparison technique described herein.

As illustrated, Multi-URL comparison system 140 includes memory 152. Memory 152 may be similar to or different from memory 110 of the server 102. In general, memory 152 may store various objects or data, including any parameters, variables, algorithms, instructions, rules, constraints, or references thereto associated with the purposes of the system landscape management module 146, the application testing module 148, and/or the response comparison module 150. For example, illustrated memory 152 includes results 154, system landscapes 156, and URLs 158. The results 154 may store generated result sets associated with different testing requests and/or different sets of system landscapes. The system landscapes 156 may store or reference a set of system landscapes that the Multi-URL comparison system 140 can access. The URLs 158 may store URLs and/or URIs corresponding to some or all of the system landscapes stored in the system landscapes 156.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
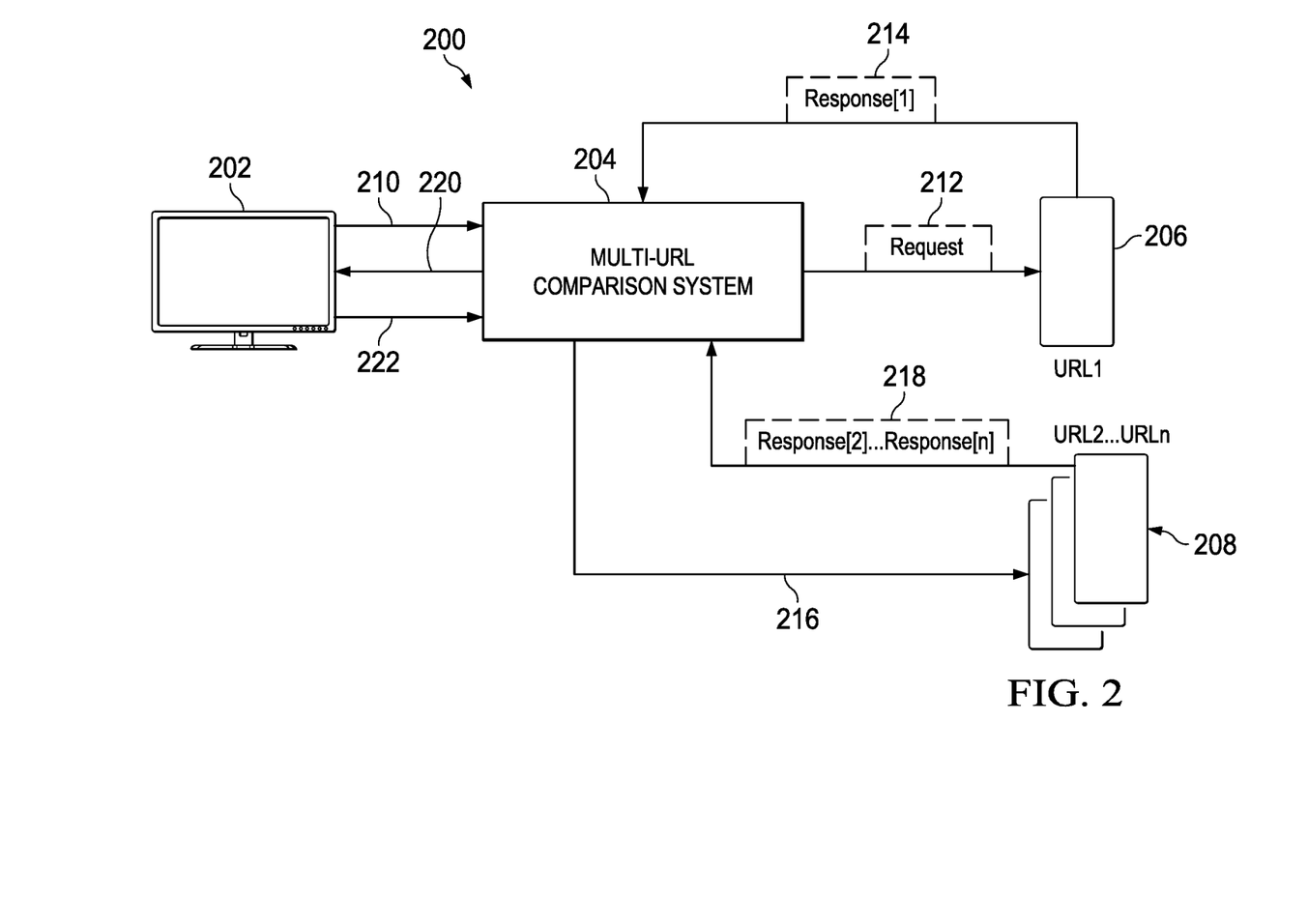
FIG. 2 is a flow diagram of an example interaction between the components of the example system.

FIG. 2 is a flow diagram of an example interaction 200 for testing applications on multiple system landscapes. In some implementations, the interaction 200 may include additional and/or different components not shown in the flow diagram. Components may also be omitted from the interaction 200, and additional messages may be added to the interaction 200. The components illustrated in FIG. 2 may be similar to or different from those described in FIG. 1.

As illustrated in FIG. 2, client 202 is connected to Multi-URL comparison system 204. The Multi-URL comparison system 204 connects to a plurality of URLs (e.g., URL1 to URLn), where each URL is associated with a different system landscape associated with a particular application for testing. In this example interaction 200, network responses are compared to a validated response. In other instances, rendered results may be compared to a validated rendered result instead. The Multi-URL comparison system 204 selects network response 214 of URL1 206 to be validated manually. The Multi-URL comparison system 204 automatically compares network responses 218 of the rest URLs 208 (e.g., URL2 to URLn) to the validated network response.

The client 202 transmits a request 210 to the Multi-URL comparison system 204 for testing an application on multiple system landscapes. In response to receiving the request 210, the Multi-URL comparison system 204 stores the request, identifies a plurality of system landscapes used or potentially used to execute the application, and generates entry points for the identified plurality of system landscapes (e.g., URL1 to URLn). The Multi-URL comparison system 204 then transmits a request 212 to entry point 206 (e.g., URL1) and transmits requests 216 to entry points 208 (e.g., URL2 to URLn). Network response 214 is received from URL1 206, while network responses 218 are received from URL2 to URLn 208. In some implementations, the request 212 and the request 216 are transmitted at the same time, or alternatively, are transmitted as a common set of requests. In those instances, a request/response combination to be used for validation of a response set may be determined after the requests are sent, and after at least some of the responses are received. In other words, the request to be validated may not be selected until multiple responses have been received in response to the requests. In some implementations, the Multi-URL comparison system 204 transmits the request to one entry point and waits for a network response before transmitting the request to another entry point. In others, the requests can be sent concurrently and/or simultaneously to the various entry points 206, 208. In the present illustration, the Multi-URL comparison system 204 transmits the network response from URL1 220 to the client 202 for validation. In some implementations, a user of the client 202 validates the network response, e.g., manually. After being validated, the validated network response 222 is transmitted to the Multi-URL comparison system 204. In response to receiving the validated network response, the Multi-URL comparison system 204 compares the received network responses 218 to the validated network response 214 and generates a result set of the comparison of each received network response to the validated network response. In some implementations, headers in network responses are ignored when performing the comparison. In some instances, a set of rendered results associated with the network responses may be compared instead of the content of the network responses itself.

Figure 3:
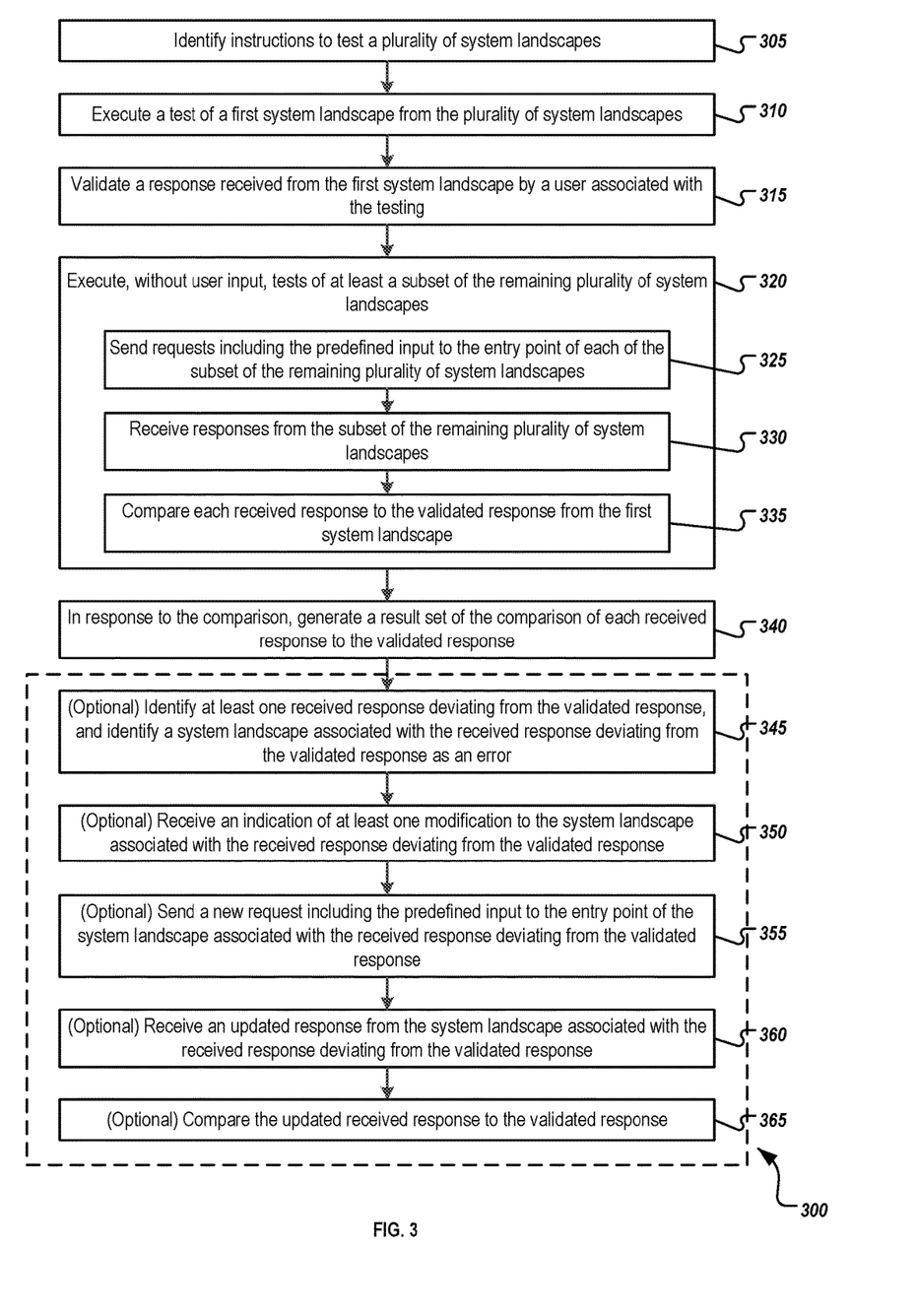
FIG. 3 is a flowchart of an example method for testing applications on multiple system landscapes.

FIG. 3 is a flowchart of an example method 300 for testing applications on multiple system landscapes. It will be understood that method 300 and related methods may be performed, for example, by any suitable system, environment, software, and hardware, or a combination of systems, environments, software, and hardware, as appropriate. For example, one or more of a client, a server, or other computing device can be used to execute method 300 and related methods and obtain any data from the memory of a client, the server, or the other computing device. In some implementations, the method 300 and related methods are executed by one or more components of the system 100 described above with respect to FIG. 1. For example, the method 300 and related methods can be executed by the Multi-URL comparison system 140 of FIG. 1.

At 305, instructions to test a plurality of system landscapes are identified. Each system landscape includes a combination of components for executing a particular version of an application. Each system landscape is associated with an entry point for execution. In some instances, the entry point is a version-specific URL or URI. In some instances, the instructions to test the plurality of system landscapes are received from a client, and the testing is performed by a proxy system remote from the client. In some instances, each system landscape includes a unique combination of components as compared to each of the other system landscapes.

At 310, a test of a first system landscape from the plurality of system landscapes is executed. In some instances, the first system landscape is selected randomly from the plurality of system landscapes. In some instances, the first system landscape is selected from the plurality of system landscapes based on a ranking. Executing the test of the first system landscape includes sending a request to the entry point of the first system landscape. The request includes a predefined input for the test, e.g., for which a set of expected or calculable results can be estimated or predicted.

At 315, a response received from the first system landscape is validated by a user associated with the testing. In some instances, validating the response received from the first system landscape includes validating a rendered result of the received response. In some instances, validating the response includes validating contents of a network response received from the first system landscape.

At 320, tests of at least a subset of the remaining plurality of system landscapes are executed without user input. In some instances, tests of at least the subset of the remaining plurality of system landscapes are executed in response to validating the response received from the first system landscape. In some instances, tests of at least the subset of the remaining plurality of system landscapes are executed concurrently with the execution of the test of the first system landscape. In some implementations, a response to be validated by the user associated with the testing may be randomly or manually selected from a plurality responses received from the plurality of system landscapes. Executing the tests of the subset of the remaining plurality of system landscapes includes, for example, three process actions as described as following. At 325, requests are sent to the entry point of each of the subset of the remaining plurality of system landscapes. The requests include the predefined input for the tests similar to the predefined input associated with the request sent to the first system landscape. At 330, responses from the subset of the remaining plurality of system landscapes are received. At 335, each received response is compared to the validated response from the first system landscape. In some instances, comparing each received response to the validated response from the first system landscape includes comparing rendered results of each received response to the rendered result of the validated response. In some instances, comparing each received response to the validated response includes comparing network responses of each received response to the validated network response. In some instances, isolated shadow browser instance (e.g., same browser on the same client) for every URL may be implemented so that the comparison can be performed in a single browser. In some instances, responses from relevant URLs are rendered and resulted images are compared.

At 340, a result set of the comparison of each received response to the validated response is generated in response to the comparison. In some instances, the generated result set is presented to a user associated with the testing.

In some implementations, further operations for testing applications on multiple system landscapes can be optionally performed. At 345, at least one received response deviating from the validated response is identified. The system landscape associated with the received response deviating from the validated response is identified as being associated with a possible error based on the failing or deviating response to the test. In some instances, the at least one received response deviating from the validated response is based on a determination that the at least one received response includes different contents as compared to the validated response or that a rendered result from a particular system landscape does not match a rendered results associated with the validated response.

At 350, an indication that at least one modification to a system landscape associated with a received response deviating from the validated response (e.g., that failed the comparison with the validated response) is received. The indication may be received at a time after the initial testing of 320 through 340 is performed. At 355, a new testing request is sent to the system landscape at which the at least one modification is identified. The new request can include the predefined input to the entry point of the system landscape associated with the received response deviating from the validated response. In some instances, the new request is a previously stored request including the predefined input. When the test information (e.g., test request, test responses, validated test response, system landscapes) is stored, it is easy to later access the stored test information and validate a solution of the error (e.g., the modification) on the particular system landscape that fails the test. At 360, an updated response is received from the system landscape associated with the at least one modification. At 365, the updated received response is compared to the validated response. Based on the comparison, a determination as to whether the new response matches the validated response can be made, where if the responses match, it can be considered that the system landscape associated with the at least one modification has been corrected by those modifications.

Additional process actions (not shown in FIG. 3) may be added to improve the performance of the testing mechanism. In some instances, the validated response and each of the received responses are associated with a respective response time (e.g., the time between sending a request and receiving a corresponding response). A particular response time is determined to deviate from an average response time by more than a predetermined threshold time, threshold percentage, or by a number of standard deviations from the average response time, among others. In some instances, the average response time is a calculated average time of all respective response time. A system landscape associated with the determined response time deviation is identified as associated with an issue in the generated result set.

Figure 4:
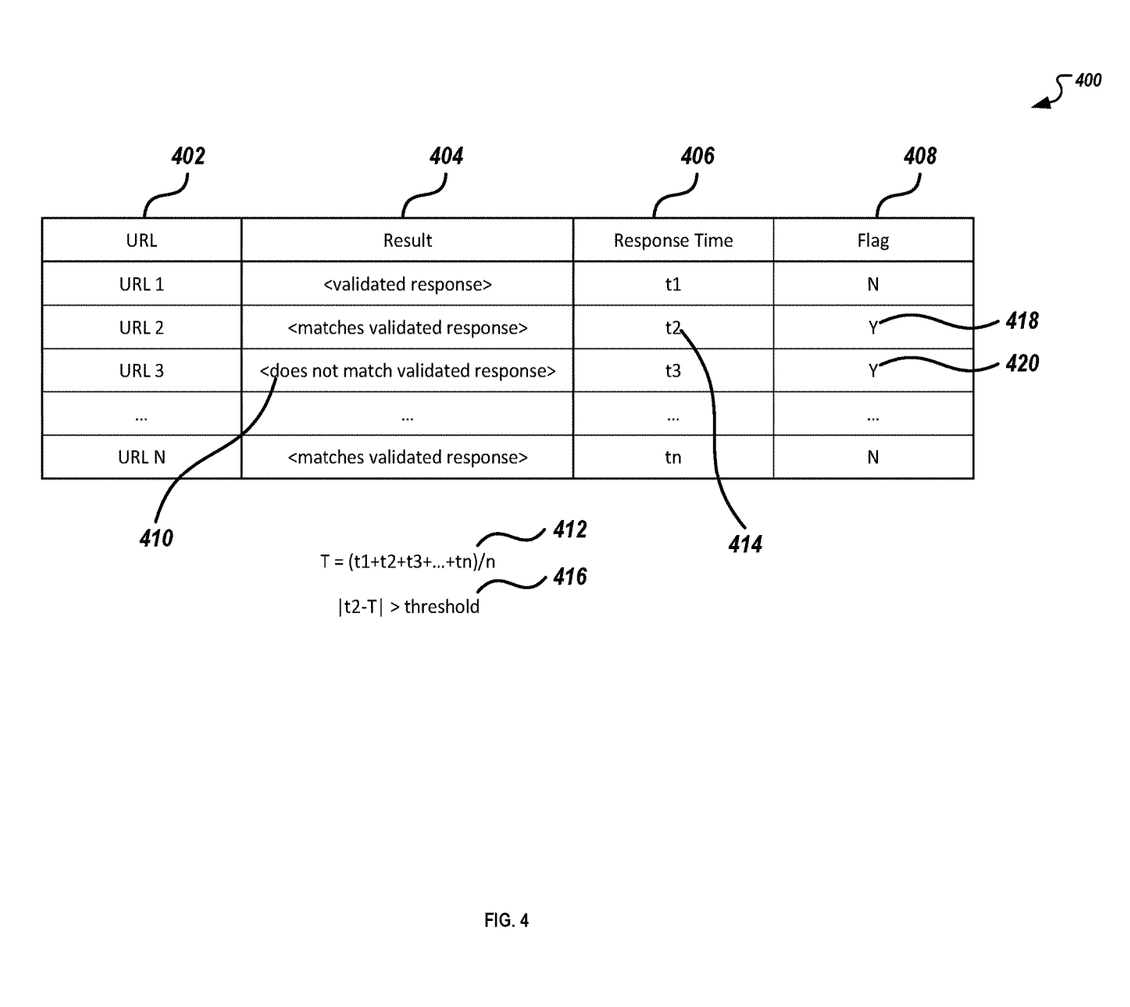
FIG. 4 is an example screenshot of a sample generated result.

FIG. 4 illustrates an example screenshot 400 of a sample generated result. In this example, network responses and response time are compared. URL 402 lists the URLs (e.g., URL1 to URLn) that are tested. Results 404 lists the comparison result of the network responses. Response time 406 lists the comparison result of the response time. Flag 408 indicates whether a system landscape associated with a particular URL is identified as an error for failing the test.

In the example screenshot 400, network response from URL1 is identified as validated response. Network responses from URL2 to URLn are compared to the validated response. For example, network response from URL2 matches the validated response while network response from URL3 does not match the validated response 410. As a result, flag 420 identifies the system landscape corresponding with entry point URL3 as being associated with an error for failing the test.

Average response time T 412 is calculated by averaging all respective response time (e.g., t1 to tn). In this example, response time t2 414 for URL2 deviates from the average response time T by more than a predetermined threshold time 416. In other instances, deviations by a predefined percentage of or standard deviation from the average response time T may alternatively identify a possible error. As a result, flag 418 identifies the system landscape corresponding with entry point URL2 as being associated with an error for failing the test.

Alternative methods of testing applications on multiple system landscapes may be used in other implementations. Those described herein are examples and are not meant to be limiting.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method performed by one or more processors, the method comprising:
identifying instructions to test a plurality of system landscapes, wherein each system landscape comprises a combination of components for executing a particular version of an application, and wherein each system landscape is associated with an entry point for execution;
executing a test of a first system landscape from the plurality of system landscapes, wherein executing the test of the first system landscape comprises sending a request including a predefined input to the entry point of the first system landscape;
validating a response received from the first system landscape by a user associated with the testing;
executing, without user input, tests of at least a subset of the remaining plurality of system landscapes, wherein executing the tests of the subset of the remaining plurality of system landscapes comprises:
sending requests including the predefined input to the entry point of each of the subset of the remaining plurality of system landscapes;
receiving responses from the subset of the remaining plurality of system landscapes; and
in response to the validation of the response by the user, comparing, automatically and without further user input, each received response to the user-validated response from the first system landscape; and
in response to the comparison, generating a result set of the comparison of each received response to the validated response, wherein generating the result set of the comparison of each received response to the validated response includes identifying at least one received response deviating from the validated response, and wherein a system landscape associated with the received response deviating from the validated response is identified as an error;
receiving an indication of at least one modification to the system landscape associated with a received response deviating from the validated response;
sending a new request including the predefined input to the entry point of the system landscape associated with the received response deviating from the validated response;
receiving an updated response from the system landscape associated with the received response deviating from the validated response; and
comparing the updated received response to the validated response.

2. The method of claim 1, wherein validating the response received from the first system landscape comprises validating a rendered result of the received response, and wherein comparing each received response to the validated response from the first system landscape comprises comparing rendered results of each received response to the rendered result of the validated response.

3. The method of claim 1, wherein validating the response comprises validating a network response received from the first system landscape, and wherein comparing each received response to the validated response comprises comparing network responses of each received response to the validated network response.

4. The method of claim 1, wherein the at least one received response deviates from the validated response based on different contents of the at least one received response as compared to the validated response.

5. The method of claim 1 further comprising presenting the generated result set to the user.

6. The method of claim 1, wherein the entry point is a version-specific URL or URI.

7. The method of claim 1, wherein the instructions to test the plurality of system landscapes are received from a client, and wherein the testing is performed by a proxy system remote from the client.

8. The method of claim 1, wherein each system landscape comprises a unique combination of components as compared to each of the other system landscapes.

9. A non-transitory computer storage medium encoded with a computer program, the program comprising instructions that when executed by one or more computers cause the one or more computers to perform operations comprising:
identifying instructions to test a plurality of system landscapes, wherein each system landscape comprises a combination of components for executing a particular version of an application, and wherein each system landscape is associated with an entry point for execution;
executing a test of a first system landscape from the plurality of system landscapes, wherein executing the test of the first system landscape comprises sending a request including a predefined input to the entry point of the first system landscape;
validating a response received from the first system landscape by a user associated with the testing;
executing, automatically in response to the validation of the response by the user and without further user input, tests of at least a subset of the remaining plurality of system landscapes, wherein executing the tests of the subset of the remaining plurality of system landscapes comprises:
automatically sending requests including the predefined input to the entry point of each of the subset of the remaining plurality of system landscapes;
receiving responses from the subset of the remaining plurality of system landscapes; and
comparing, automatically and without further user input, each received response to the user-validated response from the first system landscape; and
in response to the comparison, generating a result set of the comparison of each received response to the validated response, wherein generating the result set of the comparison of each received response to the validated response includes identifying at least one received response deviating from the validated response, and wherein a system landscape associated with the received response deviating from the validated response is identified as an error;
receiving an indication of at least one modification to the system landscape associated with a received response deviating from the validated response;
sending a new request including the predefined input to the entry point of the system landscape associated with the received response deviating from the validated response;
receiving an updated response from the system landscape associated with the received response deviating from the validated response; and
comparing the updated received response to the validated response.

10. The medium of claim 9, wherein validating the response received from the first system landscape comprises validating a rendered result of the received response, and wherein comparing each received response to the validated response from the first system landscape comprises comparing rendered results of each received response to the rendered result of the validated response.

11. The medium of claim 9, wherein validating the response comprises validating a network response received from the first system landscape, and wherein comparing each received response to the validated response comprises comparing network responses of each received response to the validated network response.

12. The medium of claim 9, wherein the at least one received response deviates from the validated response based on different contents of the at least one received response as compared to the validated response.

13. A system comprising:
one or more processors; and
a computer-readable medium storing instructions executable by the one or more processors to perform operations comprising:
identifying instructions to test a plurality of system landscapes, wherein each system landscape comprises a combination of components for executing a particular version of an application, and wherein each system landscape is associated with an entry point for execution;
executing a test of a first system landscape from the plurality of system landscapes, wherein executing the test of the first system landscape comprises sending a request including a predefined input to the entry point of the first system landscape;
validating a response received from the first system landscape by a user associated with the testing;
executing, without user input, tests of at least a subset of the remaining plurality of system landscapes, wherein executing the tests of the subset of the remaining plurality of system landscapes comprises:
sending requests including the predefined input to the entry point of each of the subset of the remaining plurality of system landscapes;
receiving responses from the subset of the remaining plurality of system landscapes; and
in response to the validation of the response by the user, comparing, automatically and without further user input, each received response to the user-validated response from the first system landscape; and
in response to the comparison, generating a result set of the comparison of each received response to the validated response, wherein generating the result set of the comparison of each received response to the validated response includes identifying at least one received response deviating from the validated response, and wherein a system landscape associated with the received response deviating from the validated response is identified as an error;
receiving an indication of at least one modification to the system landscape associated with a received response deviating from the validated response;
sending a new request including the predefined input to the entry point of the system landscape associated with the received response deviating from the validated response;
receiving an updated response from the system landscape associated with the received response deviating from the validated response; and
comparing the updated received response to the validated response.

14. The system of claim 13, wherein validating the response received from the first system landscape comprises validating a rendered result of the received response, and wherein comparing each received response to the validated response from the first system landscape comprises comparing rendered results of each received response to the rendered result of the validated response.

15. The system of claim 13, wherein validating the response comprises validating a network response received from the first system landscape, and wherein comparing each received response to the validated response comprises comparing network responses of each received response to the validated network response.

* * * * *